Nov. 7, 1967    J. R. HANNER    3,350,755
WEDGE LOCK CLAMP AND FASTENER DEVICE
Filed May 19, 1965                 2 Sheets-Sheet 1

INVENTOR.
JOHN R. HANNER
BY
Victor J. Evans Co.
Attorneys

Nov. 7, 1967  J. R. HANNER  3,350,755
WEDGE LOCK CLAMP AND FASTENER DEVICE
Filed May 19, 1965  2 Sheets-Sheet 2
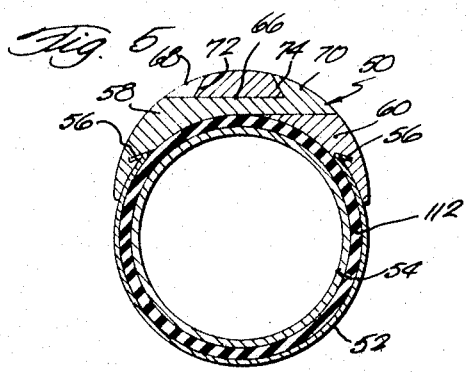
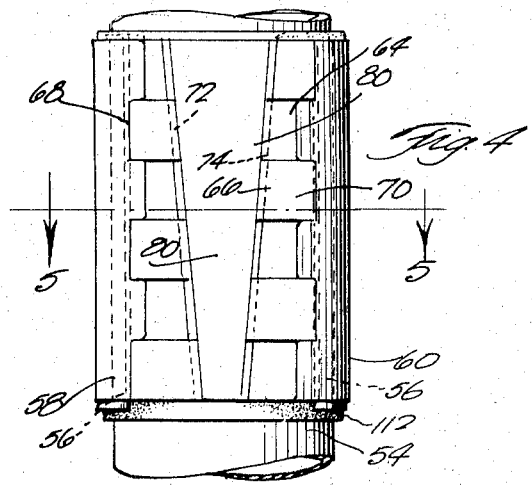
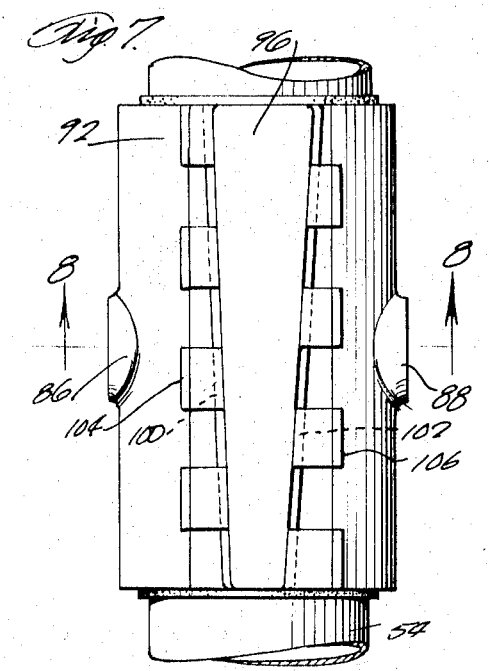
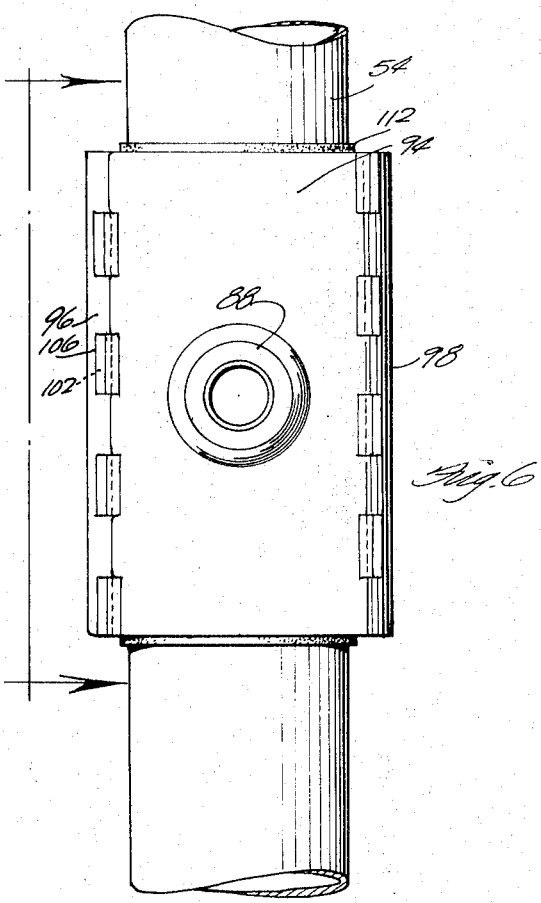
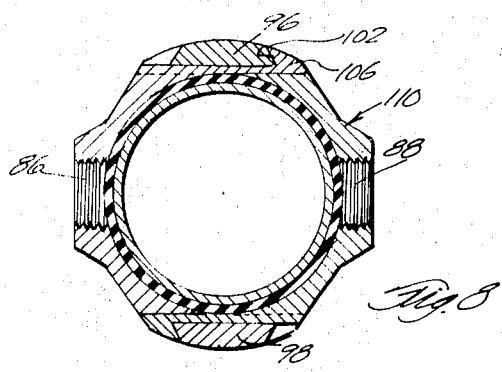
INVENTOR.
JOHN R. HANNER
BY
Attorneys

United States Patent Office 3,350,755
Patented Nov. 7, 1967

3,350,755
WEDGE LOCK CLAMP AND FASTENER DEVICE
John R. Hanner 2630 Michigan Ave., Dallas, Tex. 75216
Filed May 19, 1965, Ser. No. 457,110
1 Claim. (Cl. 24—263)

ABSTRACT OF THE DISCLOSURE

The wedge lock clamp and fastener device includes a set of support bodies and a set of inter-fitting fingers 64, 68 extending integrally from each of said support bodies, a wedge 80, each of said fingers having ends for overwrapping a leading edge of said wedge when said wedge is interposed between the ends of the sets of fingers and in which the leading edge of the wedge has an inclined surface for assuring a secure and tight relation between the wedge and the ends of the fingers. Also the wedge has a pointed contour and inclined leading edge on each side thereof adapted to fit within the wedge receiving portion formed by the fingers so that the backward extending incline surface on the finger extensions is adapted to overwrap the leading and inclined edges of the wedge to form a wedge lock clamp and fastener device.

---

The present invention relates to an improved wedge lock clamp and fastener device, and more particularly relates to a fastening device utilizing a wedge which may be driven or forced into place to be securely retained by mutually engaging sets of ends of fingers extending from a set of mounting means. The wedge may be used to secure the set of interengaging fingers in a secure relationship, and may be forced thereto by any suitable means such as hammering or the like. The wedge used to fit and engage between the set of fingers is tapered, and the leading edges of the wedge may have an inclined plane to exert a pressure on the other parts such as the ends of the fingers forming the clamp. The relationship of the fingers is also arranged to conform to the shape of the wedge so that it is a dovetail or receiving relationship provided thereby.

An object of the invention is to provide a fastening device which may be made of metal, plastic or other suitable materials, by machining, casting, forging, stamping and forming; and in which there is provided a wedge having a taper that may vary to suit the job.

By means of the present invention, there is provided a wedge lock clamp and fastening device that may be used in connection with a leak repair or leak-proof clamp having a fastener that may completely encircle a pipe or sheet metal or other construction for encircling the pipe and providing a mounting means so that stress and other forces are not brought to bear upon the means being supported, so that in the event liquids or other materials are conveyed thereby, no leaks are apparent.

The fastener of the present invention may be employed as a full circle clamp having a gasket either butting or lapping at the ends which seals completely around the pipe and thereby provides an additional leak-proof construction for supporting the pipe. The fastener may be used with a gasket on the side for repairing a leak or hole in the pipe if such is the case. Also, when a full circle clamp is used, the clamp may couple two or more pieces of tubing together to form the pipeline, and this is convenient for use in irrigation and the like.

Also the present invention provides quick and temporary construction or supporting means that is quickly set up and as quickly dismantled.

A further object of the present invention is to provide a fastening device for holding and supporting eye beams, pipe, angle irons, channels, timbers, and the like, in a position for temporarily welding, bolting, or other uses including mounting them permanently. Also the invention may be used to construct scaffolding for quick assembly and disassembly.

The invention seeks to provide a hanging device for holding conduit, pipe, heating units and the like, in place, and by means of fasteners that attach to beams or such with turnbuckles, rods or straps will attach to the wedge of both fasteners.

It is seen therefore that by means of the invention strong and secure attachments are provided, that the fastening device is economical in manufacture, that speedy installation and removal is provided, and that the disassembly of the fastening device is achieved merely by hammering in an opposite direction from the direction in which the parts are assembled together.

Pressure tests have been made on the device of the present invention in comparison with the typical bolt type clamp presently used in the prior art, and it is seen that the wedge clamp constructed of cast ductile iron supports at least twice the force of the bolt clamp.

Other objects and advantages of the invention will become apparent upon full consideration of the following detailed description and accompanying drawings in which:

FIGURE 4 shows a wedge lock clamp and fastener device for circular or cylindrical constructions in accordance with the preferred embodiment of the invention;

FIGURE 5 is a cross-sectional view taken along line 5—5 of FIGURE 4;

FIGURE 6 shows a modification in which a coupling is provided incident to the wedge lock clamp and fastener device;

FIGURE 7 shows a side elevational view taken along line 7—7 of FIGURE 6; and

FIGURE 8 shows a cross-sectional view taken along line 8—8 of FIGURE 7.

Figure 1:
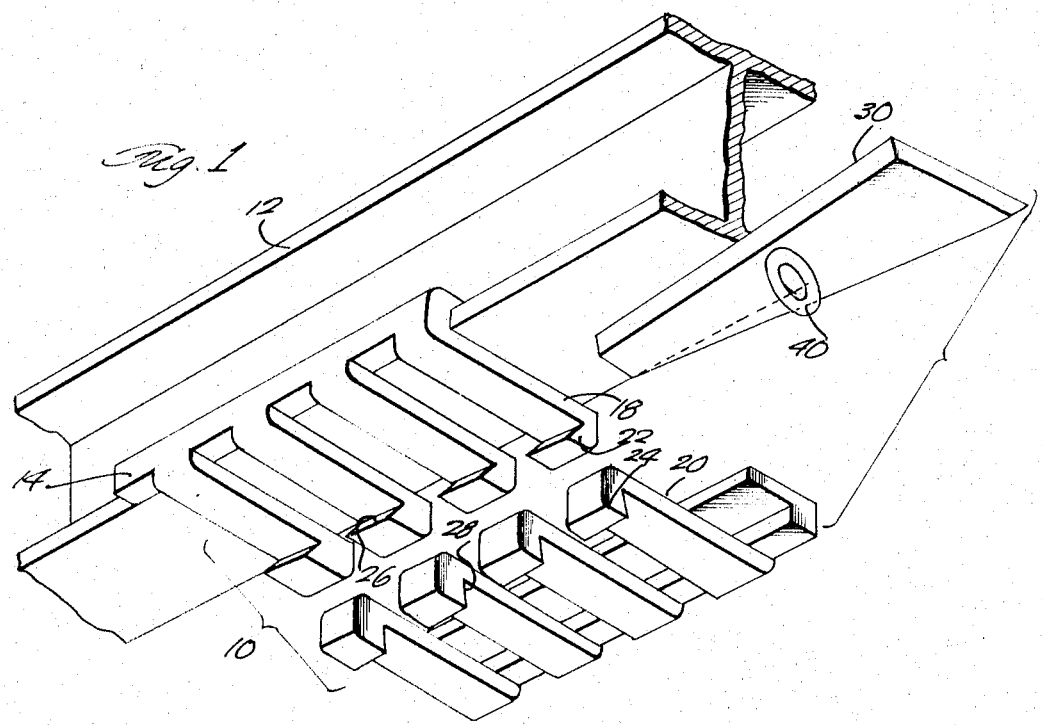
FIGURE 1 is a perspective view showing a wedge lock clamp and fastener device adapted to an "I" beam, in accordance with a preferred embodiment of the invention.
Figure 2:
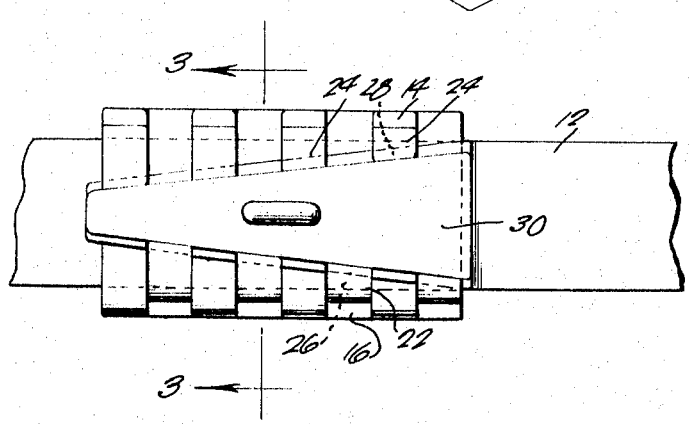
FIGURE 2 is a bottom plan view of the wedge shown in FIGURE 1.
Figure 3:
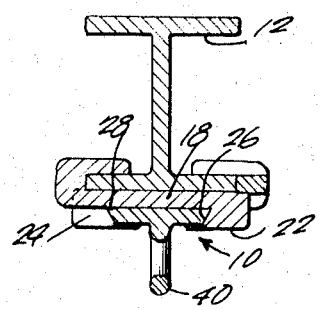
FIGURE 3 is a cross-sectional view taken along lines 3—3 of FIGURE 2.

Referring now to the drawings, there is shown in FIGURES 1–3 the improved wedge lock clamp and fastener device 10 suspended from an I beam 12, and in which the clamp and fastener device 10 is comprised of a symmetrical set of support bodies 14, 16 adapted to be mounted from the lower lip of the I beam 12, and in which there are a set of mutually engaging inter-fitting fingers 18, 20 which extend integrally from the support bodies 14, 16, respectively, and in which the inter-fitting fingers have disposed at the ends thereof a projection 22, 24 in which there is provided an inclined set of surfaces 26, 28, as shown.

From the closed position of the sets of fingers 18, 20, shown in FIGURES 2 and 3, the support bodies 14, 16 are each closely affixed to the lower lip of the I beam 12 and the sets of fingers 18, 20 engage each other sufficiently so that the extensions 22, 24 form a wedge receiving area, so the wedge body 30 is adapted to fit into and be retained by the extensions 22, 24 as provided by the inclined surfaces 26, 28. The wedge 30 is also shown as having an acute angular contour as it is projected into the wedge receiving area formed by the inclined surfaces 26, 28 of the extensions 22, 24. As the wedge is fitted closely therein the extensions 22, 24 thus retain the wedge 30 in place as provided by the retaining function provided by the inclined surfaces 26, 28, respectively, of the sets of extensions from the fingers 18, 20.

From the lower portion of the wedge, there is provided by welding or other forming processes, a hook or eyelet 40 that is adapted to receive any type of mounting means from which the wedge may be used to support suspended loads therefrom, so that the I beam is therefore provided with the support of such load by means of the wedge lock clamp and fastener device according to the present invention.

The invention is further illustrated in FIGURES 5–8 wherein there is shown a wedge lock clamp and fastener device 50 adapted to be mounted from a clamp 52 which is wrapped circularly around a cylindrical pipe or other element 54. The clamp 52 is shown having ears or projections 56, 56, such that the clamp and fastener device 50 may be secured thereon by the projections 56, 56, engaging a set of support bodies 58, 60, respectively.

The support bodies are contoured concavely so that they are adapted to fit onto the diameter of the pipe 54 as well as engage the projections 56, 56. The support bodies 58, 60 have sets of mutually engaging and interfitting fingers 64, 66, such that they terminate in ends 68, 70, ends 68, 70 having a backwardly inclined surface 72, 74 for retaining a wedge 80. The wedge 80 is adapted to engage and fit within the receiving portions formed by the inclined surfaces 72, 74, and the overall configuration of the wedge 80 is also adapted to fit within the contour provided in the overall fashion, such as shown in FIGURES 4 and 5 as a pointed contour.

In FIGURES 6, 7 and 8, there is further illustrated a modification of what is shown in FIGURES 4 and 5, so that it is apparent that a multiple coupling arrangement may be made in which a set of pipe fittings 86, 88 are provided so that a load means may be threadedly secured to the pipe fitting 86, 88, respectively. Thus, the support bodies 92, 94 are adapted to be interfittedly engaged by wedges 96, 98, as shown by the backwardly inclined portions 100, 102, of the set of fingers having extensions 104, 106, respectively, so that the component parts of the clamp and fastener device 110 are securely interfitted together in the fashion and manner as shown in the preferred embodiment of the invention as described.

A rubber gasket such as 112 may be provided in FIGURES 4–8 in order to mount the clamp and fastener device in protective relation to the pipe from which it is to be supported.

Additional embodiments of the invention in this specification will occur to others and therefore it is intended that the scope of the invention be limited only by the appended claim and not by the embodiments described hereinabove. Accordingly, reference should be made to the following claim in determining the full scope of the invention.

What is claimed is:

A wedge lock clamp and fastener device comprising a set of supporting bodies adapted to be mounted on a flange of an I-beam, a set of interfitting fingers mutually engaging each other and extending integrally from the respective support bodies, each of said fingers having a backward extending inclined surface providing a wedge-receiving portion, a wedge having a pointed contoured and an inclined leading edge on each side thereof, said wedge adapted to fit within said wedge-receiving portions formed by said fingers, so that the backward extending inclined surface of said finger extensions is adapted to over-wrap the leading and inclined edges of said wedge to form a wedge lock clamp and fastener device said wedge having article supporting means secured to a non-engaging surface thereof, said supporting bodies having their fingers joined together by spines, and said spines each having means thereon forming with the fingers channels for snugly receiving edge portions of said flange.

References Cited

UNITED STATES PATENTS

| | | | |
|---|---|---|---|
| 1,463,749 | 7/1923 | Pollak | 138—99 |
| 1,817,473 | 8/1931 | Bailey et al. | 24—268 |
| 2,234,222 | 3/1941 | Baerer. | |
| 2,778,662 | 1/1957 | Smith | 138—99 XR |
| 3,181,900 | 5/1965 | Hayward | 285—421 XR |

FOREIGN PATENTS

| | | |
|---|---|---|
| 550,030 | 12/1942 | Great Britain. |
| 920,421 | 11/1954 | Germany. |
| 626,287 | 8/1961 | Canada. |

WILLIAM FELDMAN, *Primary Examiner.*

DONALD A. GRIFFIN, *Examiner.*